March 19, 1968     W. R. POSSINGER ET AL     3,374,006
LOGGING BUNK
Filed Feb. 16, 1966     2 Sheets-Sheet 1
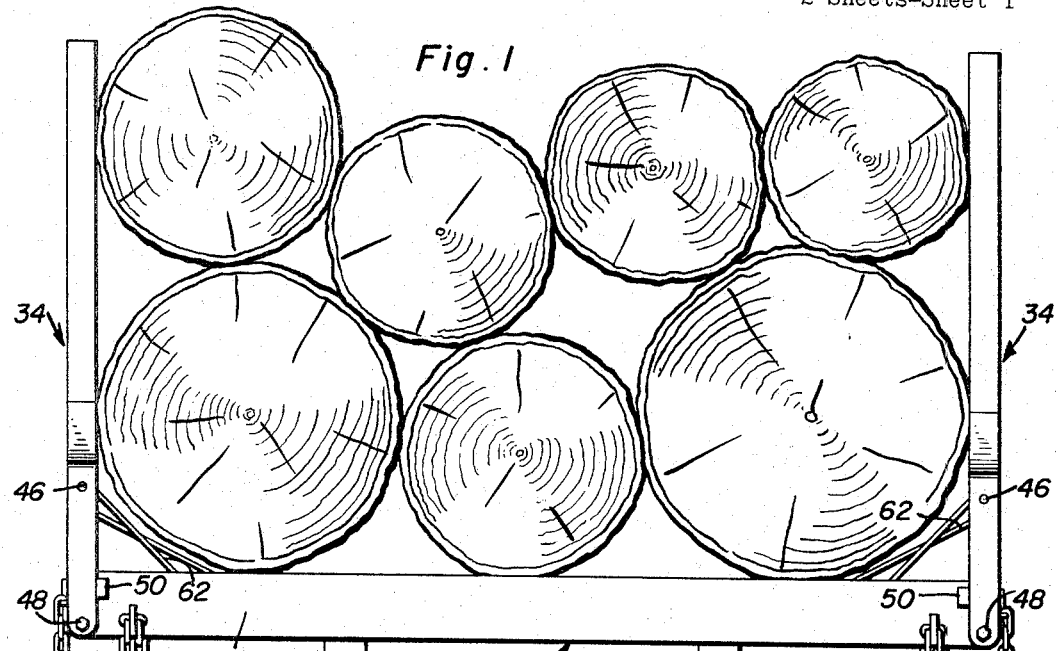
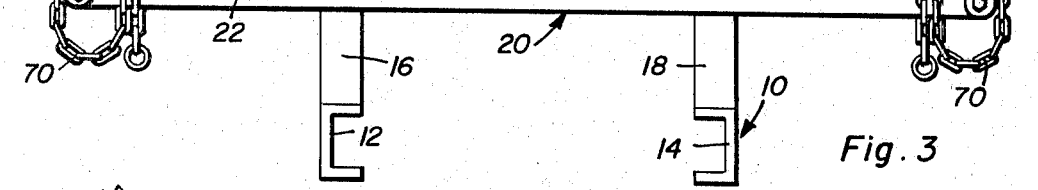
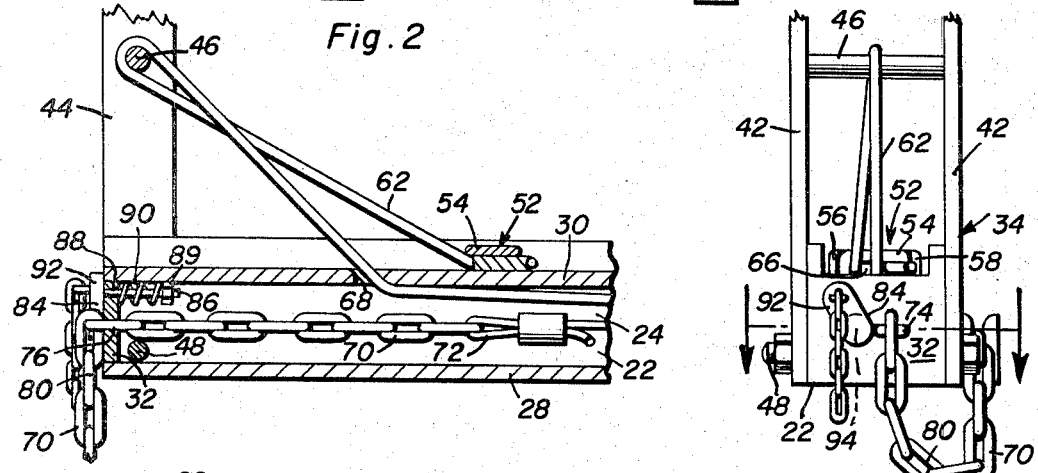
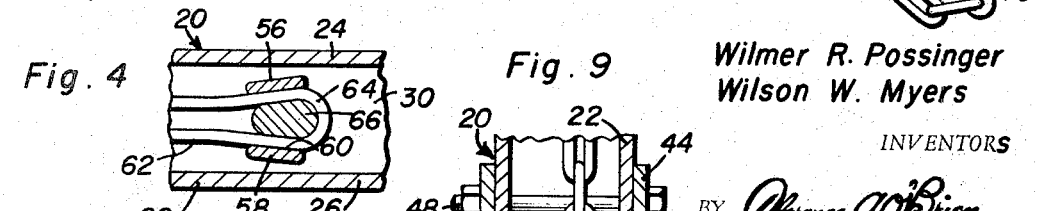
Wilmer R. Possinger
Wilson W. Myers
INVENTORS March 19, 1968  W. R. POSSINGER ET AL  3,374,006
LOGGING BUNK
Filed Feb. 16, 1966  2 Sheets-Sheet 2
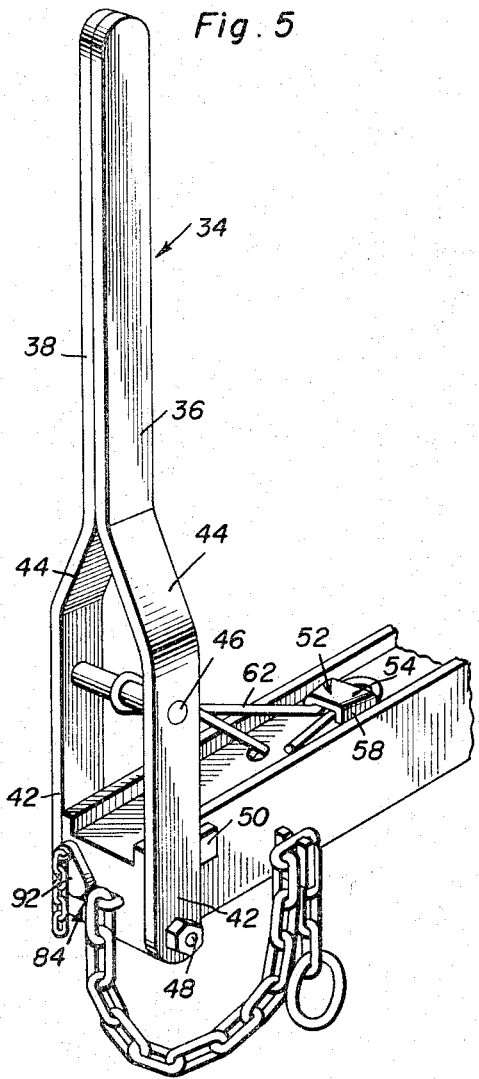
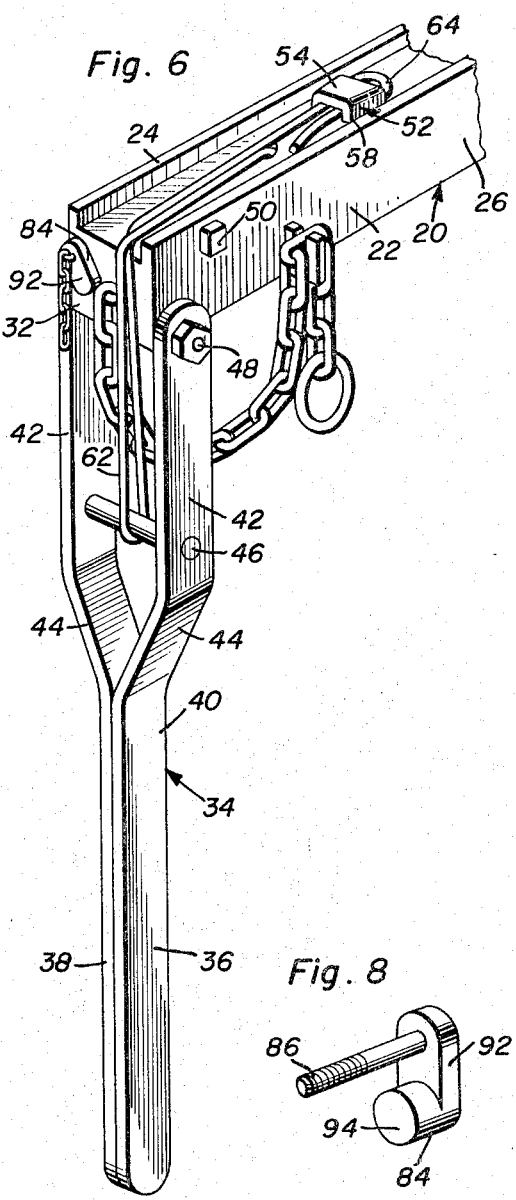
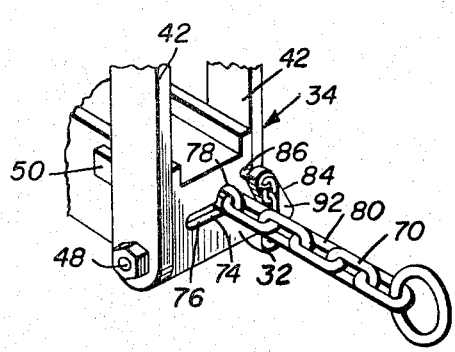
Wilmer R. Possinger
Wilson W. Myers
INVENTORS
BY Clarence A. O'Brien
and Harvey B. Jacobson
Attorneys ated Mar. 19, 1968

3,374,006
LOGGING BUNK
Wilmer R. Possinger and Wilson W. Myers, Port Angeles, Wash., assignors to Lincoln Welding, Inc., Port Angeles, Wash., a corporation of Washington
Filed Feb. 16, 1966, Ser. No. 527,820
8 Claims. (Cl. 280—145)

ABSTRACT OF THE DISCLOSURE

An elongated logging bunk defining body having corresponding ends of a pair of elongated stakes pivotally secured to its opposite ends for rotation about generally parallel axes extending transversely of the stakes and the body, the body being tubular and a pair of flexible tension members extending longitudinally of the body each including an end portion secured to the corresponding stake at a point spaced from the axis of rotation thereof and the adjacent portions of said body with the free end portions of the tension members passing downwardly through openings formed in the top wall of the body and extending outwardly of the ends of the body remote from the stakes to which the tension members are secured.

---

This invention relates to a novel and useful logging bunk construction and more specifically to a logging bunk to be fitted on a logging truck and/or trailer to secure a load of logs thereon and to facilitate the unloading of the logs therefrom.

The logging bunk is adapted to be utilized in pairs with the bunks extending transversely of the front and rear end portions of a logging truck or trailer and the logging bunk of the instant invention includes a pivoted stake or arm at each end thereof which may be locked in an upright operative position and released for outward and downward swinging movement from the opposite end of the bunk.

The main object of this invention is to provide a logging bunk including support arms or stakes at the opposite ends thereof and which are pivotally supported from the logging bunk for movement about axes extending transversely of the elongated logging bunk and which may be released from an upstanding operative position so as to be allowed to swing outwardly and downwardly to release the load of logs from the associated truck or trailer by an operator disposed on the opposite side of the truck or trailer.

Another object of this invention, in accordance with the immediately preceding object, is to provide a release mechanism for the support arms or stakes of the logging bunk of the instant invention which will be substantially foolproof in order that it will be almost impossible for a load of logs retained by the support arm or stakes of a pair of logging bunks to be inadvertently released.

A final object of this invention to be specifically enumerated herein is to provide a logging bunk in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a rear end elevational view of the body portion of a logging truck shown with the logging bunk of the instant invention operatively mounted thereon and in use to retain a load of logs on the logging truck;

FIGURE 2 is an enlarged fragmentary longitudinal vertical sectional view of the left end of the logging bunk illustrated in FIGURE 1;

FIGURE 3 is a fragmentary enlarged end elevational view of the logging bunk illustrated in FIGURE 1 as seen from the left side thereof;

FIGURE 4 is a fragmentary horizontal sectional view taken substantially upon a plane passing through one of the cable anchoring assemblies of the logging bunk;

FIGURE 5 is a fragmentary perspective view of the left end of the logging bunk illustrated in FIGURE 1 of the drawings;

FIGURE 6 is a fragmentary perspective view similar to that of FIGURE 5 but illustrating the support arm or stake in its lowered inoperative position;

FIGURE 7 is a fragmentary perspective view of the right end of the logging bunk illustrated in FIGURE 1 illustrating the manner in which the latch chain may be shifted to a released position in order to release the support arm or stake supported by the opposite end of the logging bunk;

FIGURE 8 is an enlarged perspective view of one of the latch assemblies of the logging bunk; and FIGURE 9 is a fragmentary horizontal sectional view taken substantially upon the plane designated by the section line 9—9 of FIGURE 3.

Referring now more specifically to the drawings, the numeral 10 generally designates the body of a conventional logging truck or trailer. The body or frame 10 includes a pair of longitudinally extending frame members 12 and 14 from which a pair of risers 16 and 18 are supported. The risers 16 and 18 also extend longitudinally of the frame or body 12 and a pair of the logging bunks of the instant invention are secured to and supported from the risers 16 and 18.

Although there is only one logging bunk of the instant invention illustrated and described herein it is to be noted that the elongated logging bunk, which is generally designated by the reference numeral 20, is adapted to be utilized in pairs and to extend transversely of the frame or body 10.

Each of the logging bunks 20 includes an elongated tubular body 22 including a pair of opposite side walls 24 and 26 interconnected by means of a bottom wall 28 secured to and extending between the lower marginal edge portions of the side walls 24 and 26 and a top wall 30 secured to and extending between the side walls 24 and 26 above the bottom wall 28 but a spaced distance below the upper edge portions of the side walls 24 and 26.

The opposite ends of the body 22 are closed by end walls 32 which are substantially identical in configuration and each end of the body 22 has a support arm or stake generally referred to by the reference numeral 34 pivotally secured thereto.

Each of the stakes 34 comprises a pair of elongated members 36 and 38 including laterally offset end portions 40 and 42 interconnected by means of an angulated portion 44. The end portions 40 of each pair of elongated members 36 and 38 are rigidly secured together in any convenient manner and the end portions 42 of each pair of end members 36 and 38 are braced in spaced apart relation adjacent the angulated portions 44 thereof by means of a bracing pin 46 secured to and extending between the end portions 42.

The free end of each pair of end portions 42 is pivotally secured to the corresponding end of the body 22 by means of a pivot fastener 48 secured through the side walls 24 and 26 and the end portions 42. It may best be seen from FIGS. 5–7 of the drawings that each pair of end portions 42 embracingly receives the corresponding end portion of the body 22 therebetween and that each end of each of the side walls 24 and 26 is provided with a fixed abutment block 50 to limit upward swinging movement of the corresponding stake 34 by engagement of the end portions 42 thereof with the abutment blocks 50, see FIGS. 5 and 7. In addition, as may best be seen from FIGS. 4–6 of the drawings, each of the top walls 30 is provided with a pair of cable anchor assemblies generally referred to by the reference numerals 52. Each anchor assembly 52 includes a generally inverted U-shaped member 54 including leg portions 56 and 58 secured at their lower ends to the top wall 30 and converging toward the adjacent end of the body 22 so as to define a tapered seat 60 opening toward the remote end of the body 22. One end of a flexible cable 62 has a loop 64 formed therein and a generally panel-like wedge 66 which is generally oval in plan shape is disposed in each loop 64 and disposed within the corresponding inverted U-shaped member 54 so as to wedgingly anchor the flexible cable 62 within the anchor assembly.

The other end portion of each flexible cable 62 is entrained about the brace pin 46 of the adjacent stake 34 and passed downwardly through an opening 68 formed in the top wall 30 and through the interior of the body 22 toward the remote end thereof. Each flexible cable 62 has a length of chain 70 secured thereto as at 72 and the chain 70 passes through a keyhole shaped opening 74 formed in the end wall 32 remote from the associated stake 34. Each keyhole opening 74 includes a first narrow end portion 76 and a second generally circular end portion 78 through which the free end of the associated chain 70 may be readily passed. However, the width of the narrow end portion 76 of each opening 74 is of a width to embracingly receive one of the chain links 80 and sufficiently narrow so as not to enable adjacent links 80 to pass therethrough.

In view of the foregoing it may be readily seen that the stakes 34 may be secured in their upright positions illustrated in FIG. 1 of the drawings by pulling on the chains 70 projecting from the opposite ends of the body 22 in a manner moving the chains 70 through the circular end portions of the corresponding slots or openings 74 until the chains 70 are tensioned. Then, with the stakes 34 in the upright positions engaged with the abutment stops or blocks 50, the chain 70 may be laterally displaced so as to position the chain link 80 disposed in the circular end portion 78 of each opening 74 in the narrow end portion 76 of the corresponding opening 74. This will of course prevent longitudinal shifting of the chains 70 through the openings 74 and prevent the stakes 34 from pivoting from the upright positions illustrated in FIG. 1 of the drawings toward the downwardly projecting position illustrated in FIG. 6 of the drawings.

However, without providing some means for preventing the chains 70 from being laterally displaced back toward the circular end portions 78 of the openings 74, accidental release of the chains 70 could occur should the chains 70 be moved to the circular end portions 78 by vibration of the logging bunks 20. In order to prevent such unintentional release of the chains 70, each of the openings 74 is provided with a locking assembly generally referred to by the reference numeral 84 and including a shank portion 86 slidable through a bore 88 provided therefor in the corresponding end wall 32 adjacent the circular end portion 78 of the associated opening 74. The shank portion 86 includes a diametrically enlarged abutment 89 on its inner end and a compression spring 90 is disposed about each shank portion 86 between the abutment 89 and the inner surface of the corresponding end wall 32. However, the end portion of the shank portion 86 projecting outwardly through the bore 88 has an abutment plate 92 secured thereto to prevent inward retraction of the shank portion 86 through the bore 88. In addition, each plate 92 projects laterally outwardly of the corresponding shank portion 86 an amount sufficient to cover the corresponding circular end portion 78 of the associated opening 74 and is provided with an inwardly projecting pin 94 which is receivable in the adjacent circular end portion 78 of the associated opening 74 so as to prevent rotation of the shank portion 86 about its longitudinal axis within the bore 88. However, the shank portion 86 of each latch assembly 84 may be shifted outwardly of the corresponding end wall 32 a distance greater than that which is necessary to retract the corresponding pin 94 from the associated circular end portion 78 and therefore, after outward displacement of the shank portion 86, the plate 92 may be swung about the longitudinal axis of the shank portion 86 to uncover the circular end portion 78 in order to enable the corresponding chain 70 to be shifted to the circular end portion 78 of the associated opening 74. Accordingly, when the plate 92 is swung out of registry with the circular end portion as illustrated in FIG. 7 of the drawings, the associated chain 70 may be readily moved through the circular end portion 78. However, when one of the links 80 is engaged in the narrow end portion 76 of one of the openings 74 and the plate 92 is swung to a position with its pin 94 seated in the corresponding circular end portion 78 in the manner illustrated in FIG. 5 of the drawings, it is impossible for the chain 70 to be accidentally moved to the circular end portion 78 of its associated opening 74.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A logging bunk comprising an elongated horizontally disposed body having a pair of elongated stakes pivotally secured at one pair of corresponding ends to opposite ends of said body for rotation about generally parallel axes extending transversely of said body and said stakes, said stakes and body including coacting means limiting swinging movement of the free ends of said arms upwardly and toward each other to positions with said arms substantially upright, a pair of elongated pull members operatively connected at one pair of corresponding end portions with said stakes for pivoting the latter toward said upright position in response to a pull on the other pair of corresponding end portions of said pull members, said other pair of end portions of said pull members extending toward and releasably anchorable to the remote ends of said body to prevent longitudinal shifting of said pull members relative to said body, said stakes including transversely extending members generally paralleling said axes, said other pair of end portions of said pull members being anchored to said body adjacent their terminal ends and at points spaced intermediate said axes, and the mid-portions of said pull members being passed about said transversely extending members.

2. The combination of claim 1 wherein said body is tubular and includes a top wall having openings formed therein spaced from opposite ends of said body, said pull members each extending through one of said openings, connected to the corresponding stake exteriorly of said body, and having its other end remote from the corresponding stake passed outwardly through the end of said body remote from said corresponding stake.

3. A logging bunk comprising an elongated horizontally disposed tubular body having a pair of elongated stakes pivotally secured at one pair of corresponding ends to opposite ends of said body for rotation about generally parallel axes extending transversely of said body and said stakes, said stakes and body including coacting means limiting swinging movement of the free ends of said arms upwardly and toward each other to positions with said arms substantially upright, said body including opposite end walls with openings formed therethrough, a pair of elongated pull members operatively connected at one pair of corresponding end portions with said stakes for pivoting the latter toward said upright positions in response to a pull on the other pair of corresponding end portions of said pull members, said other pair of end portions of said pull members extending toward and slidingly received through the openings in the end walls remote from the stakes to which they are operatively connected, said other pair of end portions of said pull members including means releasably engageable with the corresponding end wall to prevent longitudinal shifting of said pull members relative to said end walls, said stakes including transversely extending members generally paralleling said axes, said other pair of end portions of said pull members being anchored to said body adjacent their terminal ends and at points spaced intermediate said axes, and the mid-portions of said pull members being passed about said transversely extending members.

4. The combination of claim 3 wherein said tubular body includes a top wall having openings formed therein spaced from said end walls and said pull members each extend through one of said openings.

5. The combination of claim 4 wherein said tubular body includes upstanding opposite side walls, said top wall extending between and being secured to the upper marginal portions of said side walls a spaced distance below the upper edges thereof.

6. The combination of claim 3 wherein said openings are elongated and each include communicated wide and narrow end portions, said means releasably engageable with said end walls including alternate wide and narrow longitudinally spaced portions of said pull members, said wide portions of said pull members being readily passable through the wide portions of the corresponding openings and too wide to pass through said narrow portions, said narrow portions of said pull members being laterally displaceable from the wide portions of the corresponding openings to the narrow portions thereof.

7. The combination of claim 6 wherein said end walls include latch means releasably securable in the wide portions of the corresponding openings.

8. The combination of claim 3 wherein said openings are elongated and each include communicated wide and narrow end portions, said means releasably engageable with said end walls including alternate wide and narrow longitudinally spaced portions of said pull members, said wide portions of said pull members being readily passable through the wide portions of the corresponding openings and too wide to pass through said narrow portions, said narrow portions of said pull members being laterally displaceable from the wide portions of the corresponding openings to the narrow portions thereof, said tubular body including a top wall having openings formed therein spaced from said end walls and said pull members each extend through one of said openings.

References Cited

UNITED STATES PATENTS 2,699,340   1/1955   Lee _____ 280—145

BENJAMIN HERSH, *Primary Examiner.*

PHILIP GOODMAN, *Assistant Examiner.*